(12) United States Patent
Ramadneh et al.

(10) Patent No.: US 11,269,061 B2
(45) Date of Patent: Mar. 8, 2022

(54) SYSTEM AND METHOD OF SCANNING AND AQUIRING IMAGES OF AN ENVIRONMENT

(71) Applicant: FARO Technologies, Inc., Lake Mary, FL (US)

(72) Inventors: Ahmad Ramadneh, Kornwestheim (DE); Aleksej Frank, Korntal-Münchingen (DE); Joao Santos, Korntal-Münchingen (DE); Oliver Zweigle, Stuttgart (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 16/937,068

(22) Filed: Jul. 23, 2020

(65) Prior Publication Data

US 2020/0359003 A1 Nov. 12, 2020

Related U.S. Application Data

(63) Continuation of application No. 16/391,358, filed on Apr. 23, 2019.

(Continued)

(51) Int. Cl.
*G01S 17/894* (2020.01)
*G01S 7/481* (2006.01)
(Continued)

(52) U.S. Cl.
CPC ............ *G01S 7/481* (2013.01); *G01S 17/894* (2020.01); *G06T 7/73* (2017.01); *H04N 13/254* (2018.05);
(Continued)

(58) Field of Classification Search
None
See application file for complete search history.

(56) References Cited

U.S. PATENT DOCUMENTS 7,627,447 B2 ‡ 12/2009 Marsh ................. G06T 7/75
702/14
9,008,962 B2 ‡ 4/2015 Bandyopadhyay .... G01C 17/38
701/43
(Continued)

FOREIGN PATENT DOCUMENTS

DE 102013102554 A1 ‡ 9/2014 ............. G01C 15/00
DE 102013102554 A1 9/2014
(Continued)

OTHER PUBLICATIONS

Portales et al., "Augmented reality and photogrammetry: A synergy to visualize physical and virtual city environments" ISPRS Journal of Photogrammety and Remote Sesing, vol. 65, No. 1, Jan. 2010, pp. 134-142.‡

(Continued)

*Primary Examiner* — Beniyam Menberu
(74) *Attorney, Agent, or Firm* — Cantor Colburn LLP

(57) ABSTRACT

A system and method of scanning an environment and acquiring an image is provided. The system includes a mobile device having a camera and a first position indicator. A scanner having a light emitter and a light receiver is provided. The scanner determining coordinates of surfaces in an environment in response to emitting light with the light emitter and receiving light with the light receiver, the scanner having a second position indicator. One or more processors are provided that determine the position of the mobile computing device and transmits the data between the scanner in response to the first position indicator engaging the second position indicator.

13 Claims, 17 Drawing Sheets

Related U.S. Application Data

(60) Provisional application No. 62/664,422, filed on Apr. 30, 2018.

(51) Int. Cl.
  *G06T 7/73* (2017.01)
  *H04N 13/296* (2018.01)
  *H04N 13/254* (2018.01)

(52) U.S. Cl.
  CPC .  *H04N 13/296* (2018.05); *G06T 2207/10028* (2013.01); *G06T 2207/30244* (2013.01)

(56) References Cited

U.S. PATENT DOCUMENTS

| | | | | |
|---|---|---|---|---|
| 9,037,396 B2 ‡ | 5/2015 | Pack | ...................... | G01C 21/30 |
| | | | | 701/40 |
| 9,858,712 B2 ‡ | 1/2018 | Stathis | ...................... | G06T 17/20 |
| 2013/0229512 A1 ‡ | 9/2013 | Steffey | ...................... | G06F 3/017 |
| | | | | 348/13 |
| 2014/0253678 A1* | 9/2014 | Tocher | ...................... | G01S 17/86 |
| | | | | 348/36 |
| 2014/0253939 A1* | 9/2014 | Hashimoto | .............. | H04N 1/00 |
| | | | | 358/1.13 |
| 2015/0062123 A1* | 3/2015 | Yuen | ...................... | G06T 19/20 |
| | | | | 345/420 |
| 2015/0330762 A1 ‡ | 11/2015 | Gong | ...................... | G01B 5/008 |
| | | | | 33/503 |
| 2015/0330764 A1* | 11/2015 | Gong | ...................... | G01B 7/012 |
| | | | | 33/503 |
| 2016/0033643 A1 ‡ | 2/2016 | Zweigle | ................. | G01S 7/003 |
| | | | | 356/5.01 |
| 2016/0047914 A1* | 2/2016 | Zweigle | ................. | G05D 1/024 |
| | | | | 356/5.01 |
| 2016/0093099 A1 ‡ | 3/2016 | Bridges | ................... | G01S 17/88 |
| | | | | 348/50 |
| 2016/0178348 A1 ‡ | 6/2016 | Nagalla | ................. | G01B 5/004 |
| | | | | 250/203.2 |
| 2016/0227596 A1* | 8/2016 | Otani | .................... | H04W 48/18 |
| 2016/0327383 A1* | 11/2016 | Becker | ................ | G01B 11/005 |
| 2018/0088203 A1 ‡ | 3/2018 | Raab | ...................... | G01B 5/008 |
| 2018/0285482 A1 ‡ | 4/2018 | Santos | .................... | G06F 30/13 |
| 2019/0178643 A1 ‡ | 6/2019 | Metzler | ................. | G01C 15/002 |
| 2019/0335160 A1 | 10/2019 | Ramadneh et al. | | |

FOREIGN PATENT DOCUMENTS

| | | | | |
|---|---|---|---|---|
| EP | 2976599 B1 ‡ | 1/2016 | ................ | G06T 7/97 |
| EP | 2976599 B1 | 1/2016 | | |
| WO | 2014153429 A1 | 9/2014 | | |
| WO | 2017042402 A2 | 3/2017 | | |
| WO | WO-2017042402 A2 ‡ | 3/2017 | ........... | G01S 7/4813 |

OTHER PUBLICATIONS

Extended European Search Reoprt for Application No. 19171512.7-1206 dated Sep. 30, 2019, 11 pages.‡

\* cited by examiner
‡ imported from a related application

SYSTEM AND METHOD OF SCANNING AND AQUIRING IMAGES OF AN ENVIRONMENT

CROSS-REFERENCE TO RELATED APPLICATION

This application is a continuation application of U.S. patent application Ser. No. 16/391,358 filed Apr. 23, 2019, which claims the benefit of U.S. Provisional Application No. 62/664,422, filed Apr. 30, 2018, the contents of both of which is incorporated herein by reference in its entirety

BACKGROUND

The present application is directed to automatic registration of three-dimensional (3D) scans, and in particular to using an augmented reality (AR) enabled mobile computing device for performing one-touch registration of 3D scans of an environment.

Metrology devices, such as a 3D laser scanner time-of-flight (TOF) coordinate measurement devices for example, may be used to generate 3D representations of areas, such as buildings. A 3D laser scanner of this type steers a beam of light to a non-cooperative target such as a diffusely scattering surface of an object. A distance meter in the device measures a distance to the object, and angular encoders measure the angles of rotation of two axes in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

A 3D image of a scene, or environment, may require multiple scans from different registration positions, and the overlapping scans are registered in a joint coordinate system. Such registration is performed by matching targets in overlapping regions of the multiple scans. The targets may be artificial targets such as spheres or checkerboards or they may be natural features such as corners or edges of walls. Contemporary registration procedures involve relatively time-consuming manual procedures such as identifying by a user each target and matching the targets obtained by the scanner in each of the different registration positions.

Accordingly, while existing systems and methods of registering 3D scans of an environment are suitable for their intended purposes, what is needed are systems and methods having certain features of embodiments of the present invention.

BRIEF DESCRIPTION

According to one aspect of the invention, a system is provided. The system includes a mobile device having a camera and a first position indicator. A scanner having a light emitter and a light receiver is provided. The scanner determining coordinates of surfaces in an environment in response to emitting light with the light emitter and receiving light with the light receiver, the scanner having a second position indicator. One or more processors are provided that determine the position of the mobile computing device and transmits the data between the scanner in response to the first position indicator engaging the second position indicator.

According to another aspect of the invention, a method of scanning an environment is provided. The method includes acquiring coordinates of points of surfaces in an environment with a scanner, the scanner having a light emitter and a light receiver. An image of the environment is acquired with a camera connected to a mobile device. A first position indicator of the mobile device engages with a second position indicator of the scanner. Data is transferred between the mobile device and the scanner in response to the first position indicator engaging the second position indicator.

In accordance with another embodiment, a scanning system is provided. The scanning system includes a mobile device having a 360 degree camera and a first position indicator. A mobile scanner is provided having a light emitter and a light receiver arranged to receive light emitted from the light emitter and reflected from a surface in an environment, the scanner further having a second position indicator. One or more processors are provided that determine coordinates of surfaces in an environment in response to emitting light with the light emitter and receiving light with the light receiver, the one or more processors further determining the position of the mobile computing device and transmits the data between the scanner and the mobile device in response to the first position indicator engaging the second position indicator.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The present invention relates to automatic registration of three-dimensional (3D) scans of an environment using an augmented reality (AR) enabled mobile computing device. Contemporary mobile computing devices such as smartphones are often equipped with powerful cameras and with enough processing power to support AR applications as well as frameworks that can provide 3D pose estimation of the mobile computing device in real time. The data provided by the camera and inertial sensors of the mobile computing device can be fed into a visual simultaneous localization and mapping (SLAM) method to provide an accurate 3D pose estimation of the mobile computing device over time.

In accordance with one or more embodiments, 3D pose estimations provided by AR frameworks of mobile computing devices are used to enable automatic registration of 3D data. The estimated pose of the mobile computing device can be shared with a laser scanner when they are in contact with each other. In an embodiment, the contact is detected by using a near field communication (NFC) tag reader/writer present in most contemporary smartphones, and thus, no additional hardware is required except for a simple NFC tag that can be placed on the scanner. The current smartphone position is transmitted to the laser scanner when the smartphone and scanner are in contact with each other. The position sent to the scanner, a 3D pose estimation, is used to register the scan in the smartphone tracking frame.

In an embodiment, the smartphone can move freely and is not attached to the laser scanner while the scans are taken. In an embodiment, a user initiates an application on the smartphone that tracks a position of the smartphone. Each time that the user moves the scanner to scan from a different location in an environment, the user touches the sensor with the smartphone (e.g., is in contact) and the position of the smartphone is sent to the scanner and used to register the point clouds (e.g., in the smartphone tracking frame of reference) at a later point in time.

An advantage of performing the registration in this manner is that no additional hardware is required, only a smartphone with AR capabilities and NFC.

Figure 1:
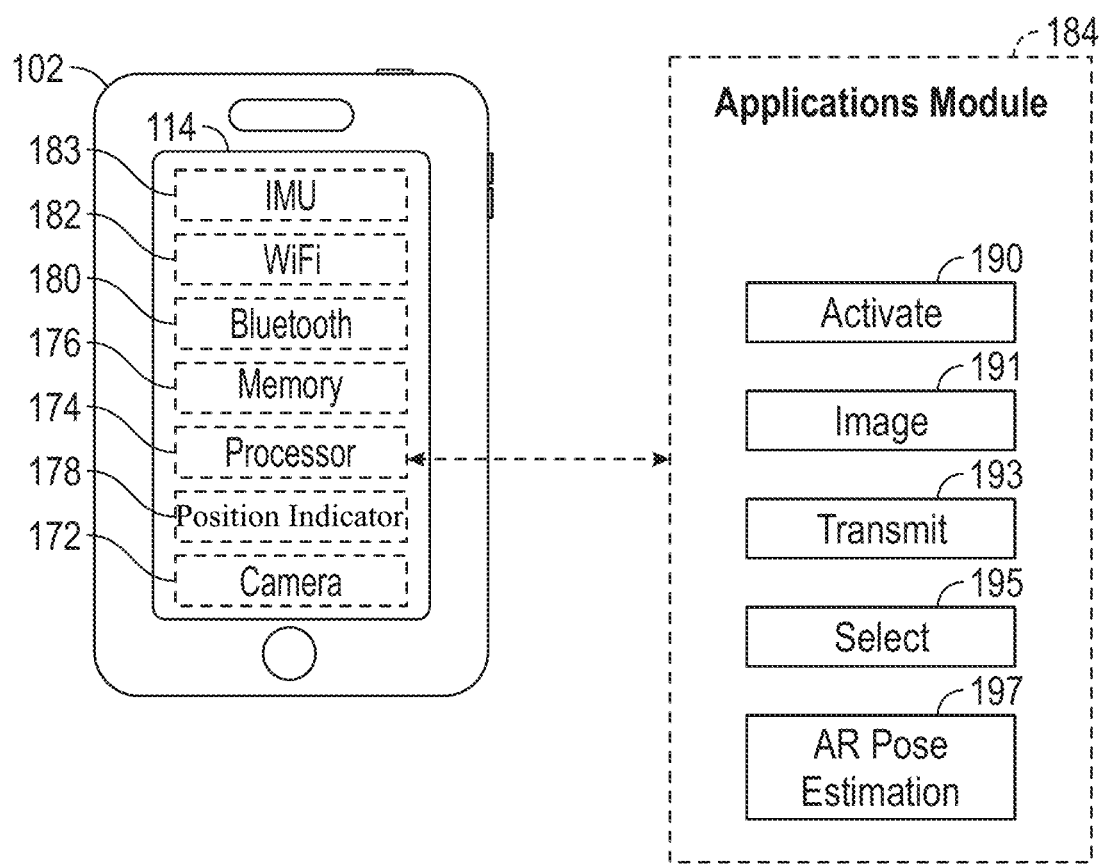
FIG. 1 is a block diagram of a mobile computing device for providing one touch registration in accordance with one or more embodiments of the present invention.

Referring now to FIG. 1, an embodiment is shown of a mobile computing device 102, such as a smartphone for example. The mobile computing device 102 may also be a cellular telephone, a smart pad, laptop computer, smart music player, or other type of smart device or other portable device having a processor and a suitable communications circuit. In an exemplary embodiment, the mobile computing device 102 includes a display 114 that presents a graphical user interface (GUI) to the user. In one embodiment, the GUI allows the user to view data, such as an image acquired by the camera 172 or a path of the user in an environment being scanned for example, and to interact with the mobile computing device 102. In an embodiment, the display 114 is a touch screen device that allows the user to input information and control the operation of the mobile computing device 102 using their fingers.

The mobile computing device 102 further includes one or more processors 174 that are responsive to executable computer instructions and for performing functions or control methods, such as those described herein. The mobile computing device 102 may further include memory 176, such as random access memory (RAM) or read-only memory (ROM) for example, for storing application code that is executed on the processor 174 and storing data, such as coordinate data for example. The mobile computing device 102 further includes communications circuits, such as Bluetooth (IEEE 1762.15.1 or its successors) circuit 180 and WiFi (IEEE 1762.11) circuit 182 for example. The communications circuits 180, 182 are transceivers, meaning each is capable of transmitting and receiving signals. It should be appreciated that the mobile computing device 102 may include additional components and circuits, such as a cellular communications circuit, as is known in the art.

In an embodiment, position indicator 178 is implemented by a NFC transceiver which may include an NFC tag and/or NFC reader. Other position indicators 178 can also be utilized by embodiments described herein to determine whether the mobile computing device 102 and the laser scanner are in contact with each other. Examples of other position indicators include, but are not limited to: a radio frequency identification system (RFID); a magnetic switch system; a feature or keying arrangement; and a machine readable indicia system. The position indicators 178, when engaged (e.g., in contact) between the mobile computing device and a scanner allow embodiments described herein to determine and record a position of the mobile computing device 102 relative to the scanner. The position of the mobile computing device (e.g., a 3D pose estimation) is sent to the scanner and can be used for registration of the 3D scans at a later point in time.

The mobile computing device 102 shown in FIG. 1 also includes an inertial measurement unit (IMU) 183. The IMU 183 is a position/orientation sensor that may include accelerometers (inclinometers), gyroscopes, a magnetometer or compass, and altimeters. Data from the IMU 183 can be stored in the memory 176.

The mobile computing device 102 shown in FIG. 1 also includes a camera 172 such as those typically provided on smartphones. In an embodiment, the camera 172 includes an RGB-D sensor that combines color information with per-pixel depth information.

The mobile computing device 102 may further include additional modules or engines 184, which may be in the form of application software that execute on processor 174 and may be stored in memory 176. One such application, such as that described in reference to FIGS. 2-6 and 9-15 for example, is a one touch registration application that allows the user to perform 3D scan registration using estimated pose data from a mobile computing device. In an embodiment, the engine 184 includes a number of sub-modules that facilitate the one touch registration application.

Figure 2:
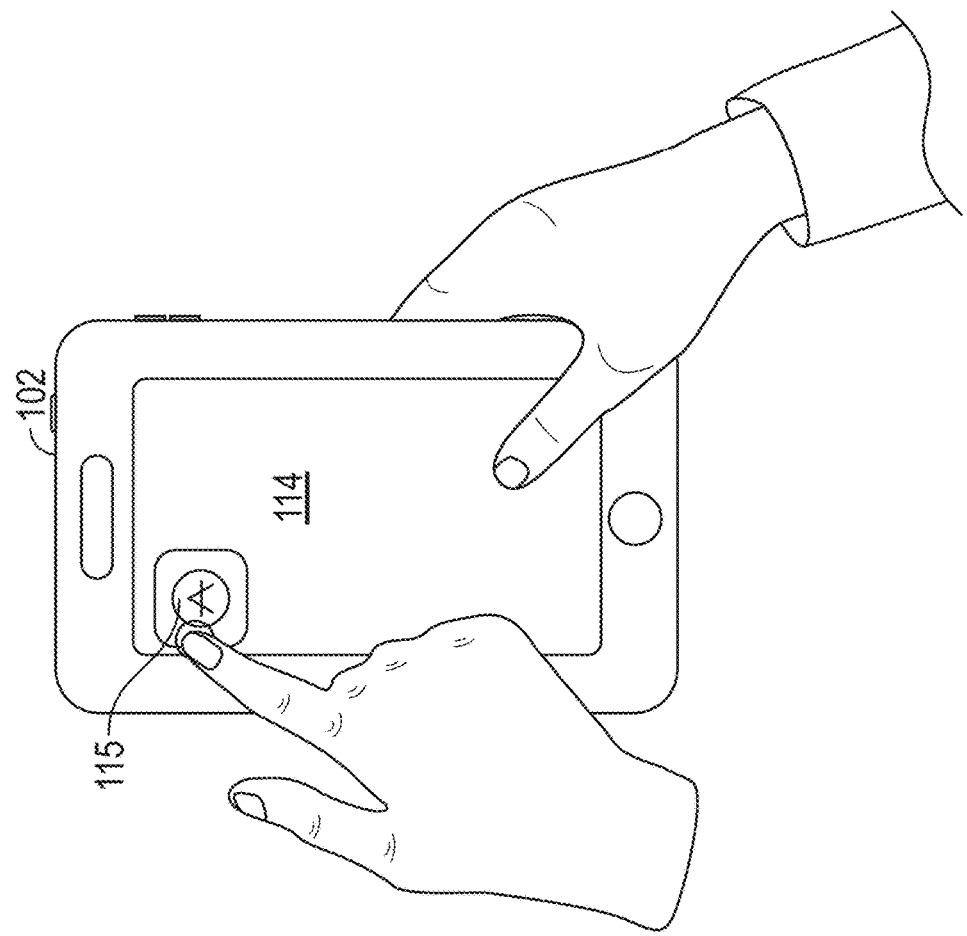
FIG. 2 is a schematic illustration of starting a one touch registration application on a mobile computing device in accordance with one or more embodiments of the present invention.
Figure 2:
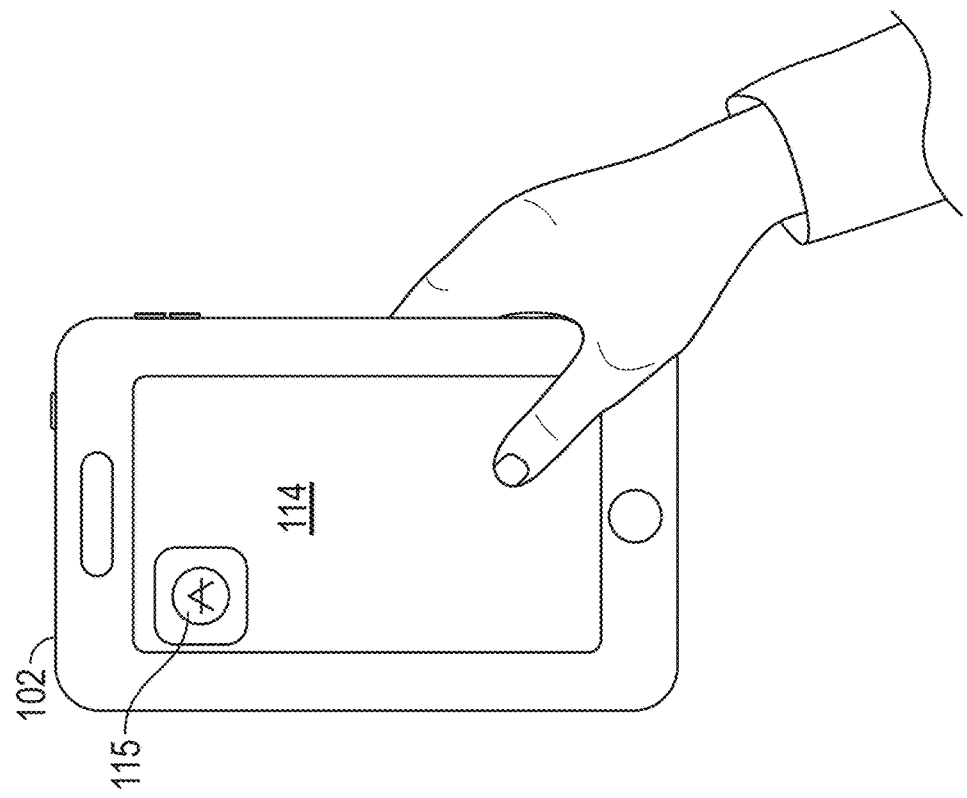
Figure 3:
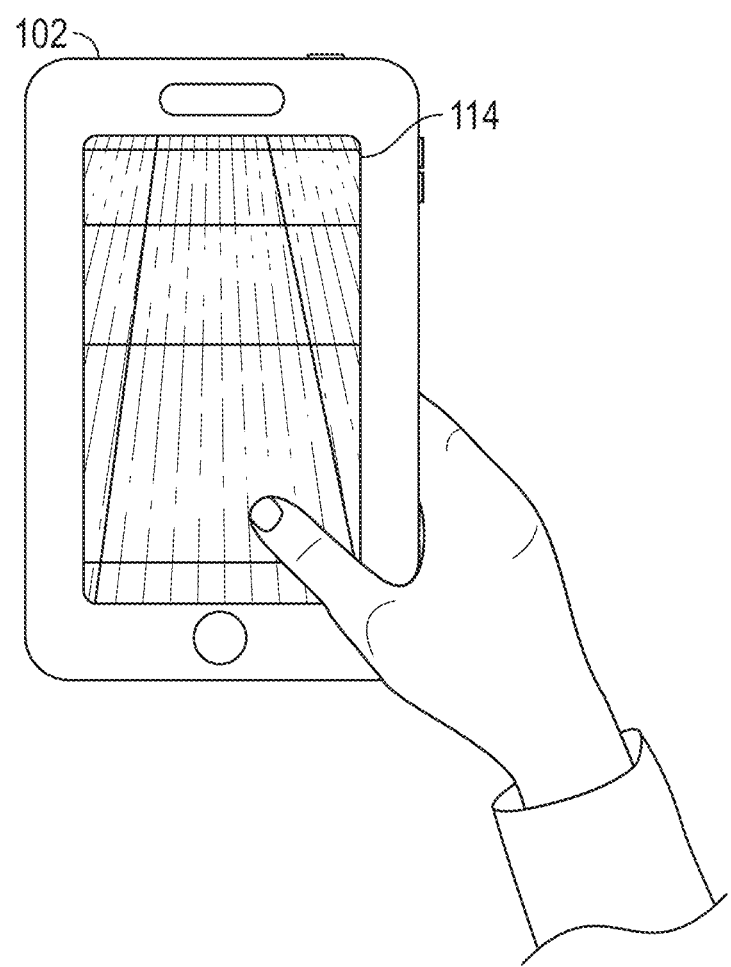
FIG. 3 is a schematic illustration of displaying a current field of view of a scanner using a mobile computing device in accordance with one or more embodiments of the present invention.

In an embodiment, the engine 184 includes an activate module 190 that starts the one touch registration application on the mobile computing device 102. As shown in FIG. 2, the one touch registration application can be started by the user selecting an icon 115 on a graphical user interface of the display screen 114. Once the one touch registration application has been initiated, an image module 191 of the one touch registration application may be used to view a current field of view of the camera 172 in the display screen 114 of the mobile computing device as shown in FIG. 3.

Figure 4:
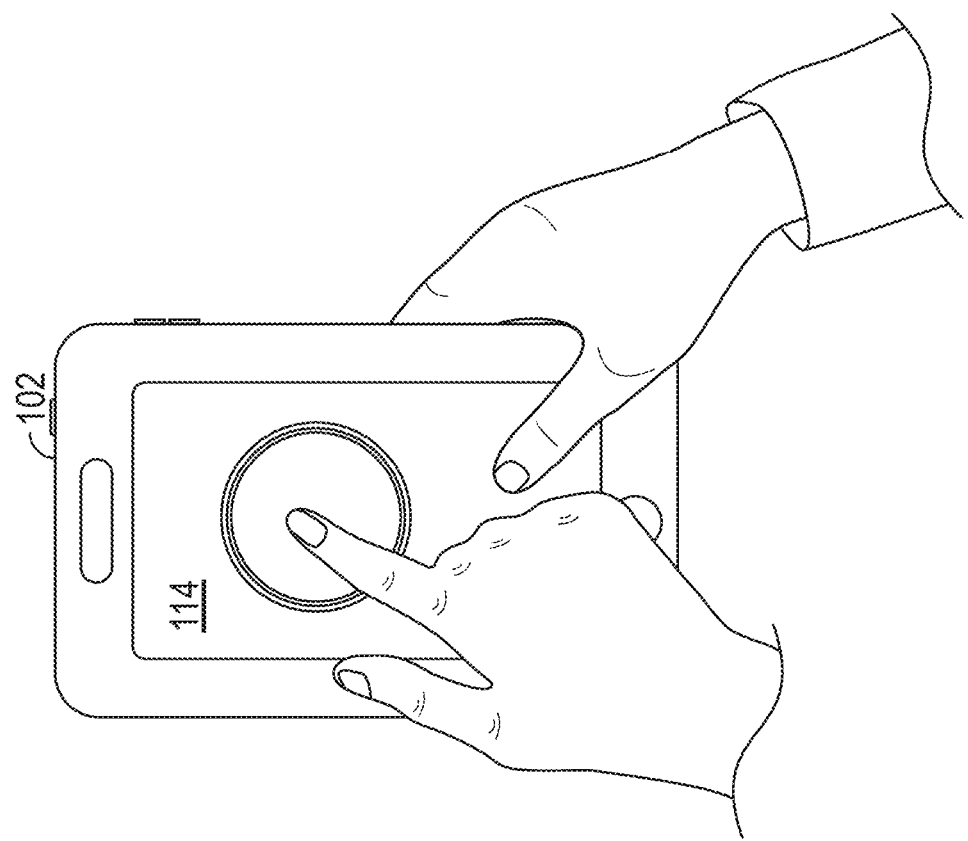
FIG. 4 is a schematic illustration of selecting a starting location using a mobile computing device in accordance with one or more embodiments of the present invention.
Figure 4:
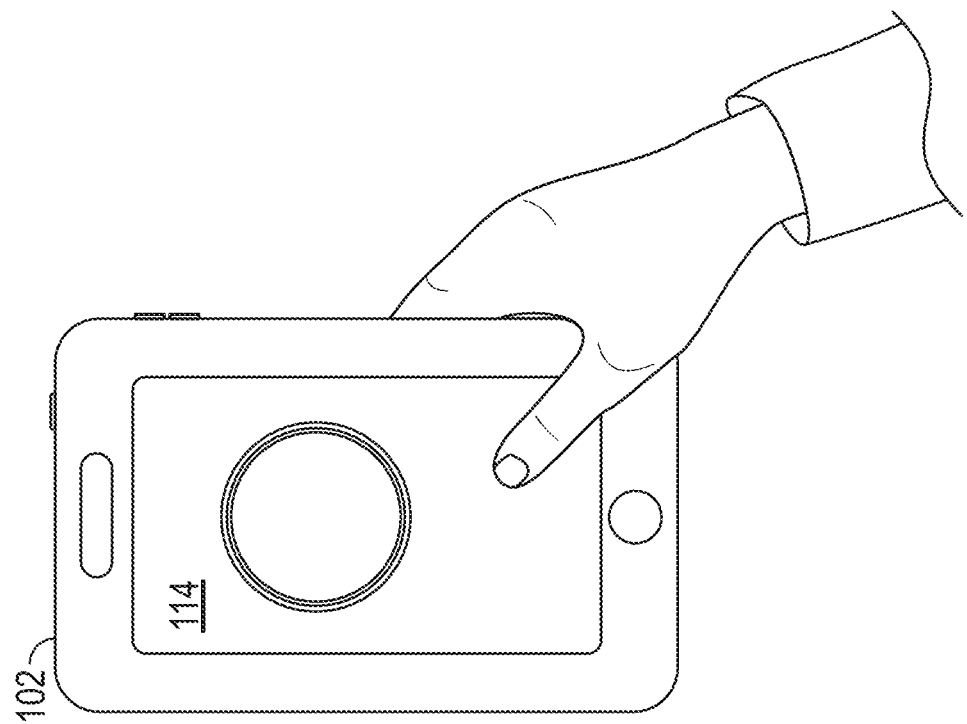

In an embodiment, the engine 184 includes a select module 195 where the user can select an initial point, or position location, as shown in FIG. 4. Selecting the initial point will initiate the AR pose estimation module 197 of the engine 184. The AR pose estimation module 197 of the engine 184 receives input from the IMU 183 and camera and generates an estimated pose of the camera 172. Frameworks that support AR applications, including 3D pose estimation, are commercially available and include, but are not limited to ARKit from Apple, Inc. which currently supports iOS platform devices and ARCore from Google which currently supports Android™ platform devices.

In an embodiment, the AR pose estimation module 197 is implemented by ARCore which, as the mobile computing device 102 moves through the environment, uses a process called concurrent odometry and mapping (COM) to understand where the mobile computing device 102 is relative to the environment around it. ARCore detects visually distinct features in the captured camera image called feature points and uses these points to compute its change in location. The visual information is combined with inertial measurements from the IMU 183 to estimate the pose (position and orientation) of the camera relative to the environment over time.

In an embodiment, the AR pose estimation module 197 is implemented by ARKit where the running AR session, initiated by selecting the initial point, continuously captures video frames from the camera 172 on the mobile computing device 102, For each frame, ARKit analyzes the image together with data from the IMU 183 to estimate the real-world position of the mobile computing device 102. The ARKit can deliver this tracking information and imaging parameters in the form of an ARFrame object.

Figure 5:
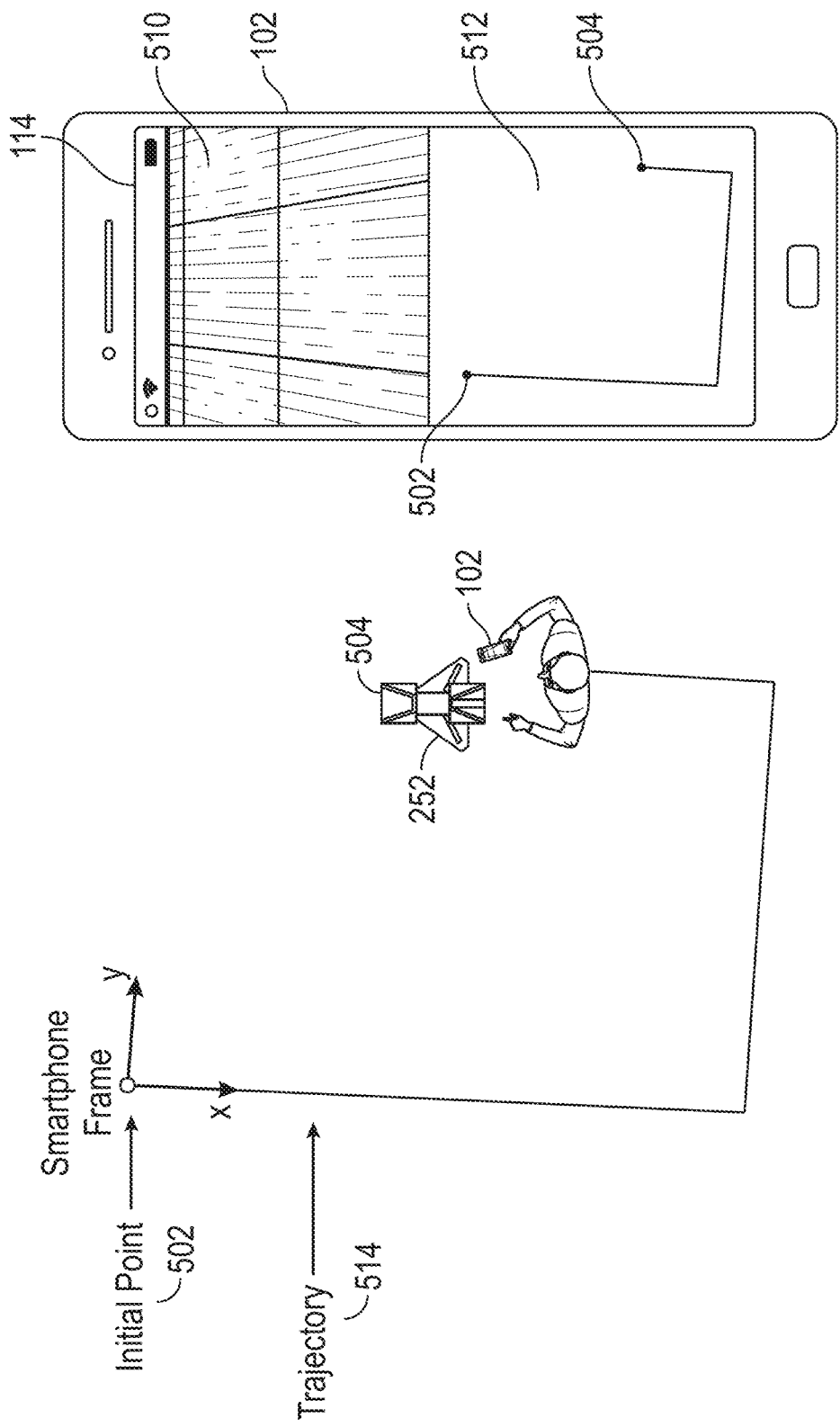
FIG. 5 is a schematic illustration of a field of view of a camera and a trajectory view on a mobile computing device in accordance with one or more embodiments of the present invention.

Turning now to FIG. 5, a schematic illustration of a field of view of a camera 510 and a trajectory view 512 of the mobile computing device 102 is shown on a graphical user interface of the display screen 114. As shown in FIG. 5, the mobile computing device 102 is implemented by a smartphone and an initial point 502 has been selected by the user using the select module 195. In response to selecting the initial point, the AR pose estimation software module 197 tracks the trajectory 514 of the mobile computing device 102 as it moves through the environment. The trajectory 514 is shown in the trajectory view 512 of the mobile computing device 102. Also shown in FIG. 5 is a laser scanner 252, currently at location 504, which is capturing 3D scans of the environment.

In an embodiment, the mobile computing device 102 makes contact with the laser scanner 252, as described in more detail herein, by being placed on or near the laser scanner 252 and the user initiates a transmission of the location of the mobile computing device 102 as determined by the pose estimation module 197 to the laser scanner. This estimated location, or 3D pose estimation, is shown as location 504 in FIG. 5, and the transmission is initiated using a transmit module 193 of the engine 184. In an embodiment, the transmit module 193 utilizes output from the NFC transceiver 178 to implement an application that transmits the location 504 of the mobile computing device 102 in response to the mobile computing device 102 touching an NFC sensor located on the laser scanner 252

Figure 6:
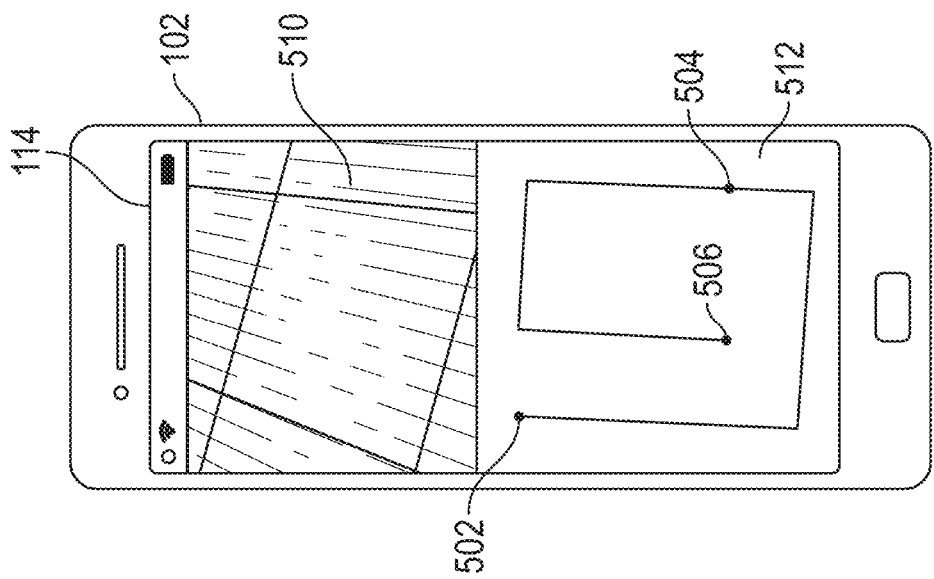
FIG. 6 is a schematic illustration of a field of view of a camera and a trajectory view on a mobile computing device in accordance with one or more embodiments of the present invention.
Figure 6:
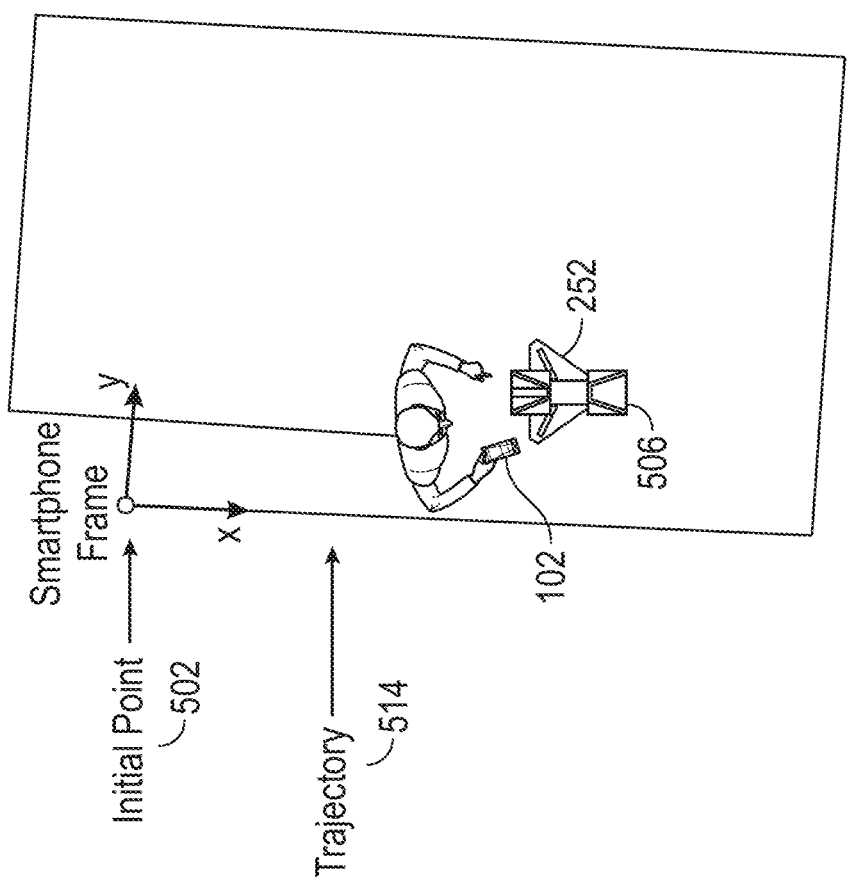

As shown in FIG. 6, the laser scanner 252 has been moved from location 504 to new location 506, and the user initiates a transmission of an estimate of the new location 506 as determined by the pose estimation module 197 to the laser scanner 252. The user can continue to transmit pose estimations of the mobile computing device 102 corresponding to each position, or location, of the laser scanner as it moves through the environment being scanned.

Figure 7:
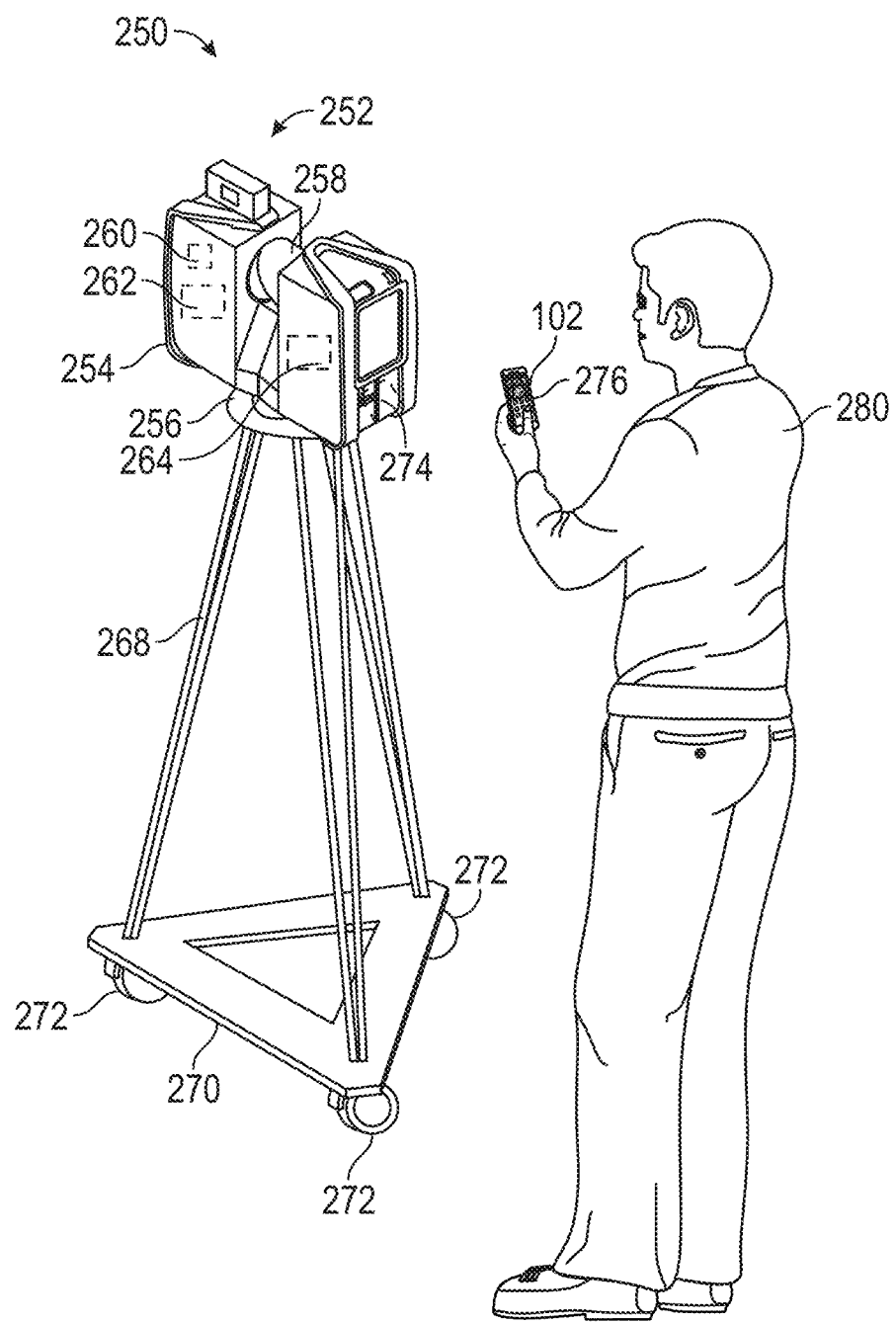
FIGS. 7-8 are views of a mobile scanning system in accordance with an embodiment.
Figure 8:
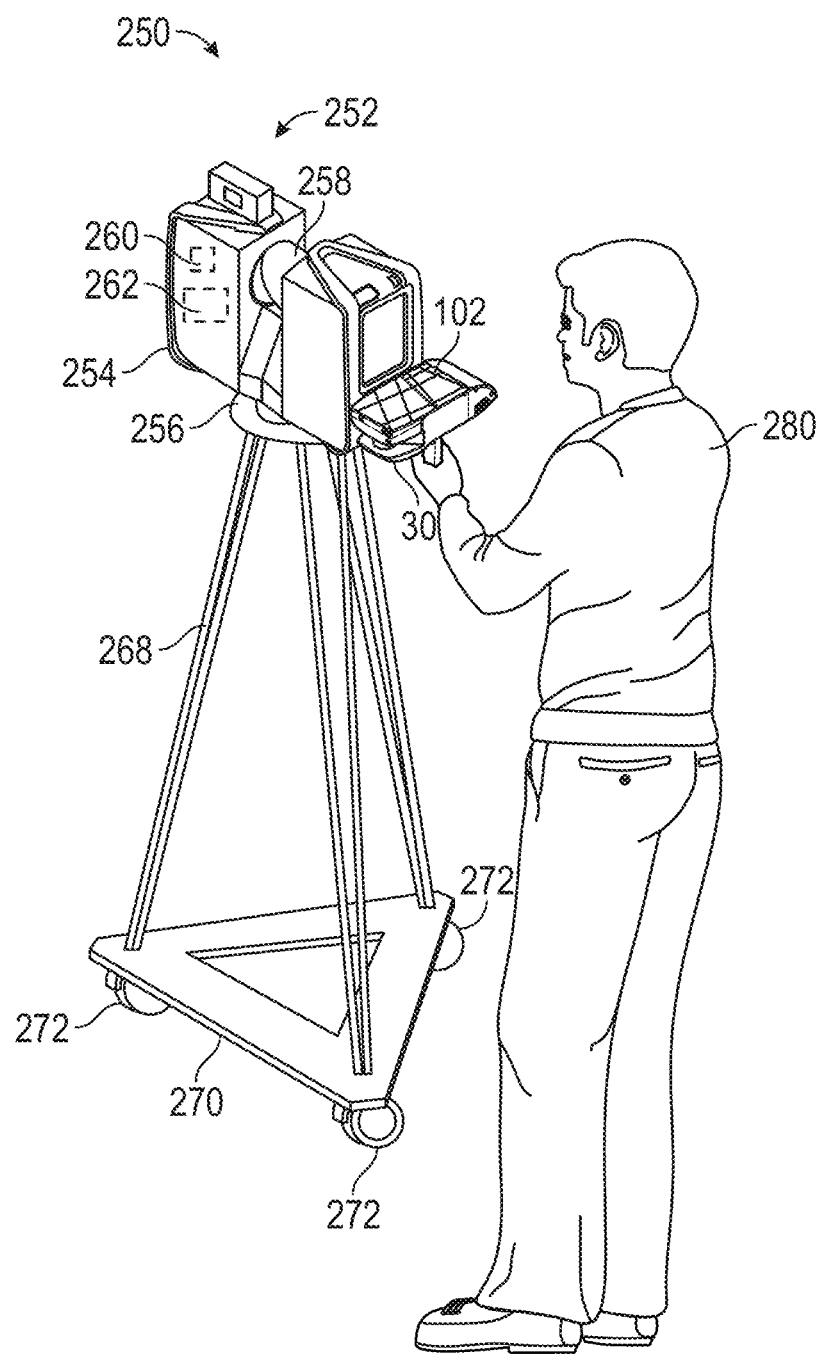

Referring now to FIG. 7 and FIG. 8, an embodiment of a mobile scanning system 250 is shown that includes a mobile computing device 102 and a 3D measurement device 252. In the exemplary embodiment, the 3D measurement device 252 is a laser scanner 252. The laser scanner 252 may be a time-of-flight type scanner such as the laser scanner described in commonly owned U.S. Pat. No. 8,705,016, the contents of which are incorporated by reference herein.

The laser scanner 252 has a measuring head 254 and a base 256. The measuring head 254 is mounted on the base 256 such that the laser scanner 252 may be rotated about a vertical axis (e.g. an axis extending perpendicular to the surface upon with the laser scanner 252 sits). In one embodiment, the measuring head 254 includes a gimbal point that is a center of rotation about the vertical axis and a horizontal axis. The measuring head 254 has a rotary mirror 258, which may be rotated about the horizontal axis. The rotation about the vertical axis may be about the center of the base 24. In the exemplary embodiment, the vertical axis and the horizontal axis are perpendicular to each other. The terms azimuth axis and zenith axis may be substituted for the terms vertical axis and horizontal axis, respectively. The term pan axis or standing axis may also be used as an alternative to vertical axis.

The measuring head 254 is further provided with an electromagnetic radiation emitter, such as light emitter 260, for example, that emits an emitted light beam 30. In one embodiment, the emitted light beam is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam is amplitude or intensity modulated, for example, with a sinusoidal waveform or with a rectangular waveform. The emitted light beam is emitted by the light emitter 260 onto the rotary mirror 258, where it is deflected to the environment. A reflected light beam is reflected from the environment by an object (e.g. a surface in the environment). The reflected or scattered light is intercepted by the rotary mirror 258 and directed into a light receiver 262. The directions of the emitted light beam and the reflected light beam result from the angular positions of the rotary mirror 258 and the measuring head 254 about the vertical and horizontal axes, respectively. These angular positions in turn depend on the corresponding rotary drives or motors.

Coupled to the light emitter 260 and the light receiver 262 is a controller 264. The controller 264 determines, for a multitude of measuring points, a corresponding number of distances between the laser scanner 252 and the points on object. The distance to a particular point is determined based at least in part on the speed of light in air through which electromagnetic radiation propagates from the device to the object point. In one embodiment the phase shift of modulation in light emitted by the laser scanner 20 and the point is determined and evaluated to obtain a measured distance.

The controller 264 may include a processor system that has one or more processing elements. It should be appreciated that while the controller 264 is illustrated as being integral with the housing of the laser scanner 252, in other embodiments, the processor system may be distributed between a local processor, an external computer, and a cloud-based computer. The processors may be microprocessors, field programmable gate arrays (FPGAs), digital signal processors (DSPs), and generally any device capable of performing computing functions. The one or more processors have access to memory for storing information. In an embodiment the controller 264 represents one or more processors distributed throughout the laser scanner 252.

The controller 264 may also include communications circuits, such as an IEEE 1762.11 (Wi-Fi) module that allows the controller 264 to communicate through the network connection, such as with a remote computer, a cloud based computer, the mobile computing device 102 or other laser scanners 252.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

The measuring head 254 may include a display device 266 integrated into the laser scanner 252. The display device 266 may include a graphical touch screen, as shown in FIG. 7, which allows the operator to set the parameters or initiate the operation of the laser scanner 252. For example, the screen may have a user interface that allows the operator to provide measurement instructions to the device, and the screen may also display measurement results.

In an embodiment, the base 256 is coupled to a swivel assembly (not shown) such as that described in commonly owned U.S. Pat. No. 8,705,012, which is incorporated by reference herein. The swivel assembly is housed within the carrying structure and includes a motor that is configured to rotate the measuring head 254 about the vertical axis.

In the exemplary embodiment, the base 256 is mounted on a frame 268, such as a tripod for example. The frame 268 may include a movable platform 270 that includes a plurality of wheels 272. As will be described in more detail herein, the movable platform 270 allow the laser scanner 252 to be quickly and easily moved about the environment that is being scanned, typically along a floor that is approximately horizontal. In an embodiment, the wheels 272 may be locked in place using wheel brakes as is known in the art. In another embodiment, the wheels 272 are retractable, enabling the tripod to sit stably on three feet attached to the tripod. In another embodiment, the tripod has no wheels but is simply pushed or pulled along a surface that is approximately horizontal, for example, a floor. In another embodiment, the optional moveable platform 270 is a wheeled cart that may be hand pushed/pulled or motorized.

In this embodiment, the mobile computing device 102 and the laser scanner 252 each have a position indicator 274, 276 respectively. As is discussed in more detail with respect to FIGS. 12-14, the position indicators may be implemented by a radio frequency identification system (RFID), a near field communications system (FIG. 12), a magnetic switch system (FIG. 13), a feature or keying arrangement or a machine readable indicia system (FIG. 14). The position indicators 274, 276, when engaged (or in contact), allow the system 250 to determine and record the position of the mobile computing device 102 relative to the laser scanner 252. Once the position indicator 276 on the mobile computing device 102 is communicating (in contact) with the position indicator 274 on the laser scanner 252, the estimated pose of the mobile computing device 102 is transmitted to the laser scanner 252. In an embodiment, the estimated pose of the mobile computing device 102 is determined by the AR pose estimation module 197 of FIG. 1. The estimated poses of the mobile computing device 102 can be used to register the 3D scans of laser scanner 252 in the tracking frame of the mobile tracking device 102.

Figure 9:
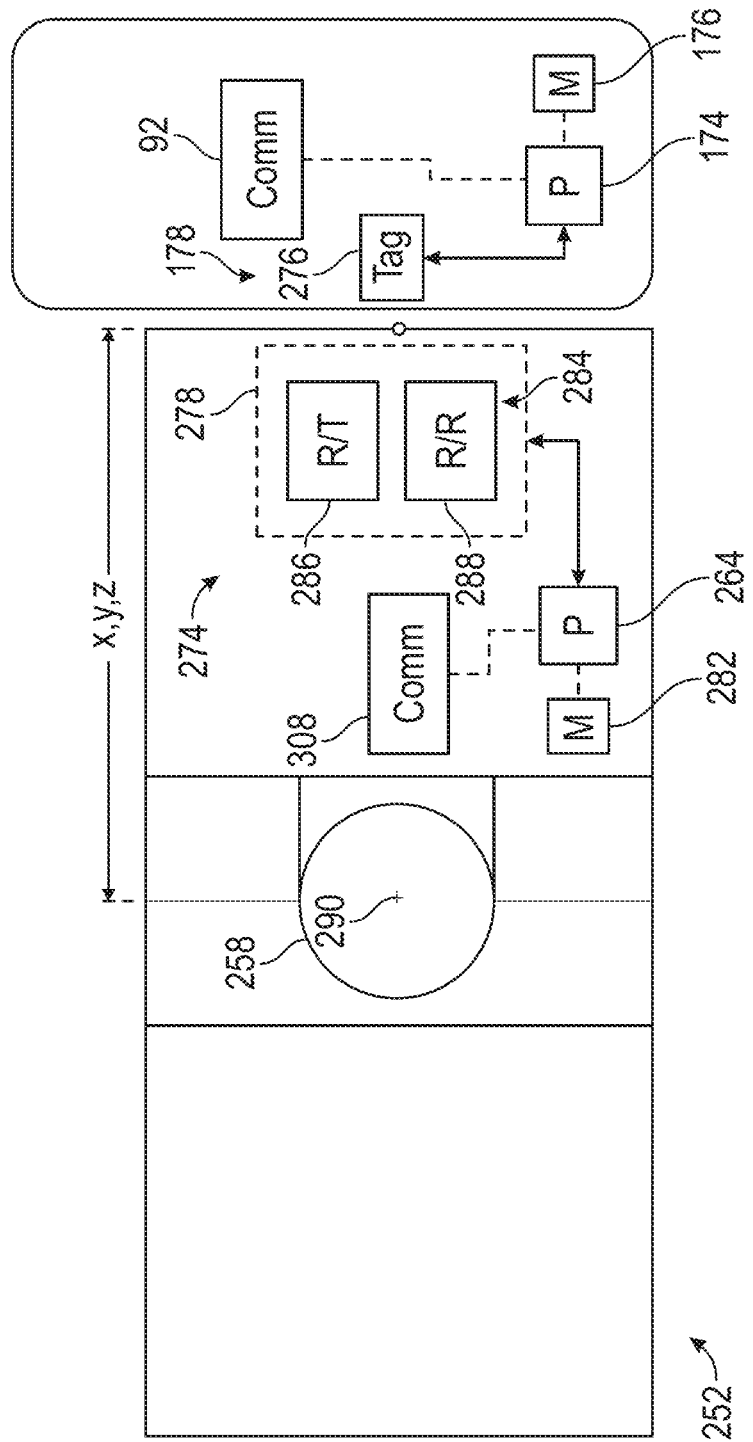
FIG. 9 is a schematic illustration of a laser scanner and mobile computing device for the system of FIG. 7.

Referring now to FIG. 9, with continuing reference to FIG. 7 and FIG. 8, an embodiment is shown of the system 250 using near field communications (NFC) for the position indicators 178, 274. A NFC system typically consists of a tag 276 and a reader 278. The tag 276 and reader 278 are typically coupled to separate devices or objects and when brought within a predetermined distance of each other, cooperate to transfer data therebetween. It should be appreciated that while embodiments herein describe the tag 276 as being mounted within or coupled to the body of the mobile computing device 102 and the reader 278 as being disposed within the housing of the laser scanner 252, this is for exemplary purposes and the claims should not be so limited. In other embodiments, the arrangement of the tag 276 and reader 278 may be reversed.

As used herein, the term "near field communications" or "NFC" refers to a communications system that allows for a wireless communications (such as that defined in ISO 14443) between two devices over a short or close range, typically less than 5 inches (127 millimeters). NFC further provides advantages in that communications may be established and data exchanged between the NFC tag 276 and the reader 278 without the NFC tag 276 having a power source such as a battery. To provide the electrical power for operation of the NFC tag 276, the reader 278 emits a radio frequency (RF) field (the Operating Field). Once the NFC tag 276 is moved within the operating field, the NFC tag 276 and reader 278 are inductively coupled, causing current flow through an NFC tag antenna. The generation of electrical current via inductive coupling provides the electrical power to operate the NFC tag 276 and establish communication between the tag and reader, such as through load modulation of the Operating Field by the NFC tag 276. The modulation may be direct modulation, frequency-shift keying (FSK) modulation or phase modulation, for example. In one embodiment, the transmission frequency of the communication is 13.56 megahertz with a data rate of 106-424 kilobits per second.

In an embodiment, the mobile computing device 102 includes a position indicator 178 that includes the NFC tag 276. The NFC tag 276 may be coupled at a predetermined location on the body of the mobile computing device 102. In an embodiment, the NFC tag 276 is coupled to the bottom of the mobile computing device 102 to facilitate the operator 2176 placing the NFC tag 276 adjacent the laser scanner 252 (FIG. 8). In an embodiment, the NFC tag 276 is coupled to communicate with the processor 174. In other embodiments, the NFC tag 276 is a passive device that is not electrically coupled to other components of the mobile computing device 102. In the exemplary embodiment, the NFC tag 276 includes data stored thereon, the data may include but is not limited to identification data that allows the mobile computing device 102 to be uniquely identified (e.g. a serial number) or a communications address that allows the laser scanner 252 to connect for communications with the mobile computing device 102.

In one embodiment, the NFC tag 276 includes a logic circuit that may include one or more logical circuits for executing one or more functions or steps in response to a signal from an antenna. It should be appreciated that logic circuit may be any type of circuit (digital or analog) that is capable of performing one or more steps or functions in response to the signal from the antenna. In one embodiment, the logic circuit may further be coupled to one or more tag memory devices configured to store information that may be accessed by logic circuit. NFC tags may be configured to read and write many times from memory (read/write mode) or may be configured to write only once and read many times from tag memory (card emulation mode). For example, where only static instrument configuration data is stored in tag memory, the NFC tag may be configured in card emulation mode to transmit the configuration data in response to the reader 278 being brought within range of the tag antenna.

In addition to the circuits/components discussed above, in one embodiment the NFC tag 276 may also include a power rectifier/regulator circuit, a clock extractor circuit, and a modulator circuit. The operating field induces a small alternating current (AC) in the antenna when the reader 278 is brought within range of the tag 276. The power rectifier and regulator converts the AC to stable DC and uses it to power the NFC tag 276, which immediately "wakes up" or initiates operation. The clock extractor separates the clock pulses from the operating field and uses the pulses to synchronize the logic, memory, and modulator sections of the NFC tag 276 with the NFC reader 278. The logic circuit separates the 1's and 0's from the operating field and compares the data stream with its internal logic to determine what response, if any, is required. If the logic circuit determines that the data stream is valid, it accesses the memory section for stored data. The logic circuit encodes the data using the clock extractor pulses. The encoded data stream is input into the modulator section. The modulator mixes the data stream with the operating field by electronically adjusting the reflectivity of the antenna at the data stream rate. Electronically adjusting the antenna characteristics to reflect RF is referred to as backscatter. Backscatter is a commonly used modulation scheme for modulating data on to an RF carrier. In this method of modulation, the tag coil (load) is shunted depending on the bit sequence received. This in turn modulates the RF carrier amplitude. The NFC reader detects the changes in the modulated carrier and recovers the data.

In an embodiment, the NFC tag 276 is a dual-interface NFC tag, such as M24SR series NFC tags manufactured by ST Microelectronics N.V. for example. A dual-interface memory device includes a wireless port that communicates with an external NFC reader, and a wired port that connects the device with another circuit, such as processor 174. The wired port may be coupled to transmit and receive signals from the processor 174 for example. In another embodiment, the NFC tag 276 is a single port NFC tag, such as MIFARE Classic Series manufactured by NXP Semiconductors. With a single port tag, the tag 276 is not electrically coupled to the processor 174.

It should be appreciated that while embodiments herein disclose the operation of the NFC tag 276 in a passive mode, meaning an initiator/reader device provides an operating field and the NFC tag 276 responds by modulating the existing field, this is for exemplary purposes and the claimed invention should not be so limited. In other embodiments, the NFC tag 276 may operate in an active mode, meaning that the NFC tag 276 and the reader 278 may each generate their own operating field. In an active mode, communication is performed by the NFC tag 276 and reader 278 alternately generating an operating field. When one of the NFC tag and reader devices is waiting for data, its operating field is deactivated. In an active mode of operation, both the NFC tag and the reader device may have its own power supply.

In an embodiment, the reader 278 is disposed within the housing of the laser scanner 252. The reader 278 includes, or is coupled to a processor, such as processor 264 coupled to one or more memory modules 282. The processor 264 may include one or more logical circuits for executing computer instructions. Coupled to the processor 560 is an NFC radio 284. The NFC radio 284 includes a transmitter 286 that transmits an RF field (the operating field) that induces electric current in the NFC tag 276. Where the NFC tag 276 operates in a read/write mode, the transmitter 286 may be configured to transmit signals, such as commands or data for example, to the NFC tag 276.

The NFC radio 284 may further include a receiver 288. The receiver 288 is configured to receive signals from, or detect load modulation of, the operating field by the NFC tag 276 and to transmit signals to the processor 264. Further, while the transmitter 286 and receiver 288 are illustrated as separate circuits, this is for exemplary purposes and the claimed invention should not be so limited. In other embodiments, the transmitter 286 and receiver 284 may be integrated into a single module. The antennas being configured to transmit and receive signals in the 13.56 megahertz frequency.

As is discussed in more detail herein, when the mobile computing device 102 is positioned on or proximate (in contact) to the laser scanner 252, the tag 276 may be activated by the reader 278. Thus the position of the mobile computing device 102 relative to the laser scanner 252 will be generally known due to the short transmission distances provided by NFC.

Terms such as processor, controller, computer, DSP, FPGA are understood in this document to mean a computing device that may be located within the system 30 instrument, distributed in multiple elements throughout the system, or placed external to the system (e.g. a mobile computing device).

Figure 10:
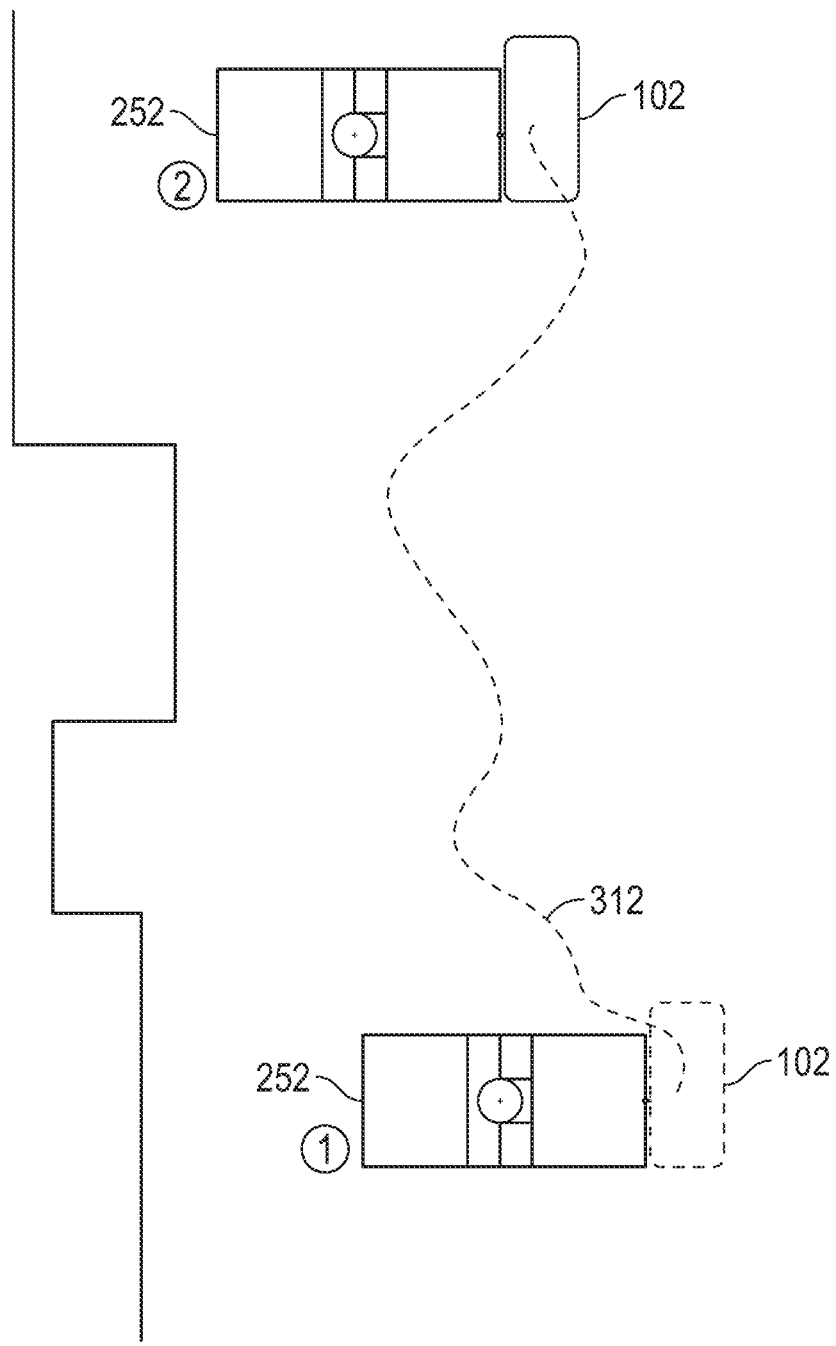
FIG. 10 is a schematic illustration of the operation of the system of FIG. 7.
Figure 11:
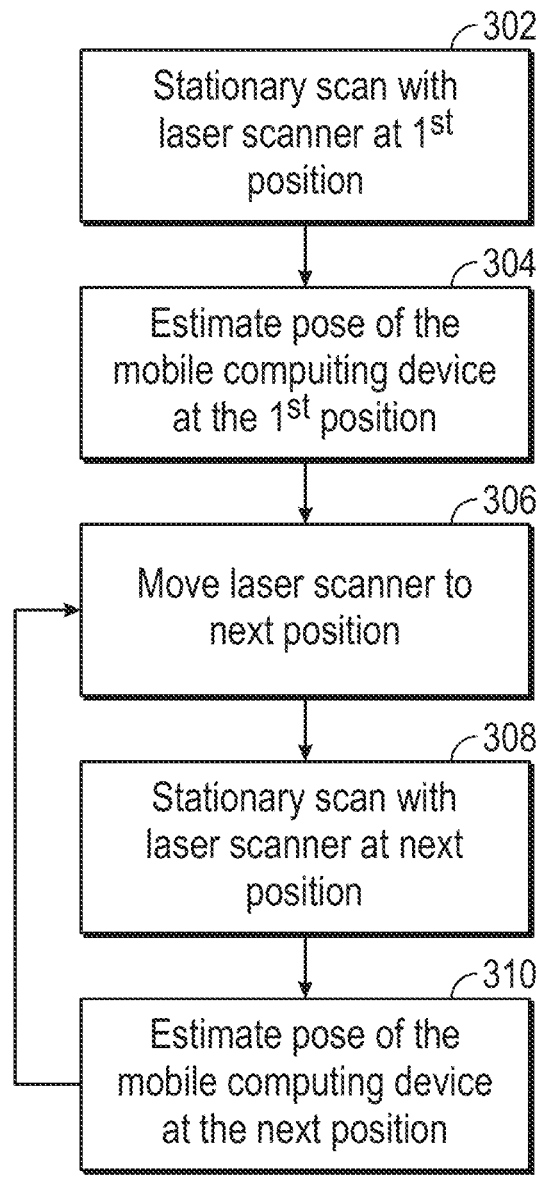
FIG. 11 is a flow diagram of a method of operating the system of FIG. 7.

Referring now to FIGS. 10-11, with continuing reference to FIGS. 7-10, a method 300 is shown of the operation of the system 250. In an embodiment, the method 300 is performed using the components of engine 184 described previously with respect to FIG. 1. The processing shown in FIG. 11 begins in block 302 with the laser scanner 252 performing a scan at a first position. During the scan at the first position (location "1" of FIG. 10), the laser scanner 252 acquires 3D coordinates for a first plurality of points on surfaces in the environment being scanned. The method 300 then proceeds to block 304 where the mobile computing device 102 is moved adjacent the laser scanner 252 such that the position indicator 178 is in contact with the position indicator 274. In the embodiment of FIG. 9, the placement of the tag 276 within range of the reader 278 can cause data to be transferred from the mobile computing device 102 to the laser scanner 252. In an embodiment, the transferred data includes an estimated pose of the mobile computing device 102 at the first position as determined, for example by AR pose estimation module 197 of FIG. 1.

The method 300 then proceeds to block 306 where the laser scanner 252 is moved from the first position to a next position (e.g. location "2" of FIG. 10). The method 300 then proceeds to block 308 where a second scan of the environment is performed by the laser scanner 252 to acquire the 3D coordinates of a second plurality of points on surfaces in the environment being scanned. The method 300 then proceeds to block 310 where the mobile computing device 102 is moved adjacent the laser scanner 252 such that position indicator 178 is in contact with the position indicator 274. In the embodiment of FIG. 9, the placement of the tag 276 within range of the reader 278 allows data to be transferred from the mobile computing device 102 to the laser scanner 252. In an embodiment, the transferred data includes an estimated pose of the mobile computing device 102 at the second first position as determined, for example by AR pose estimation module 197 of FIG. 1.

It should be appreciated that in some embodiments, the method 300 may then loop back to block 306 and additional scanning is performed at additional locations. It should further be appreciated that while the method 300 is shown as a series of sequential steps, in other embodiments, some of the blocks of method 300 may be performed in parallel.

Figure 12:
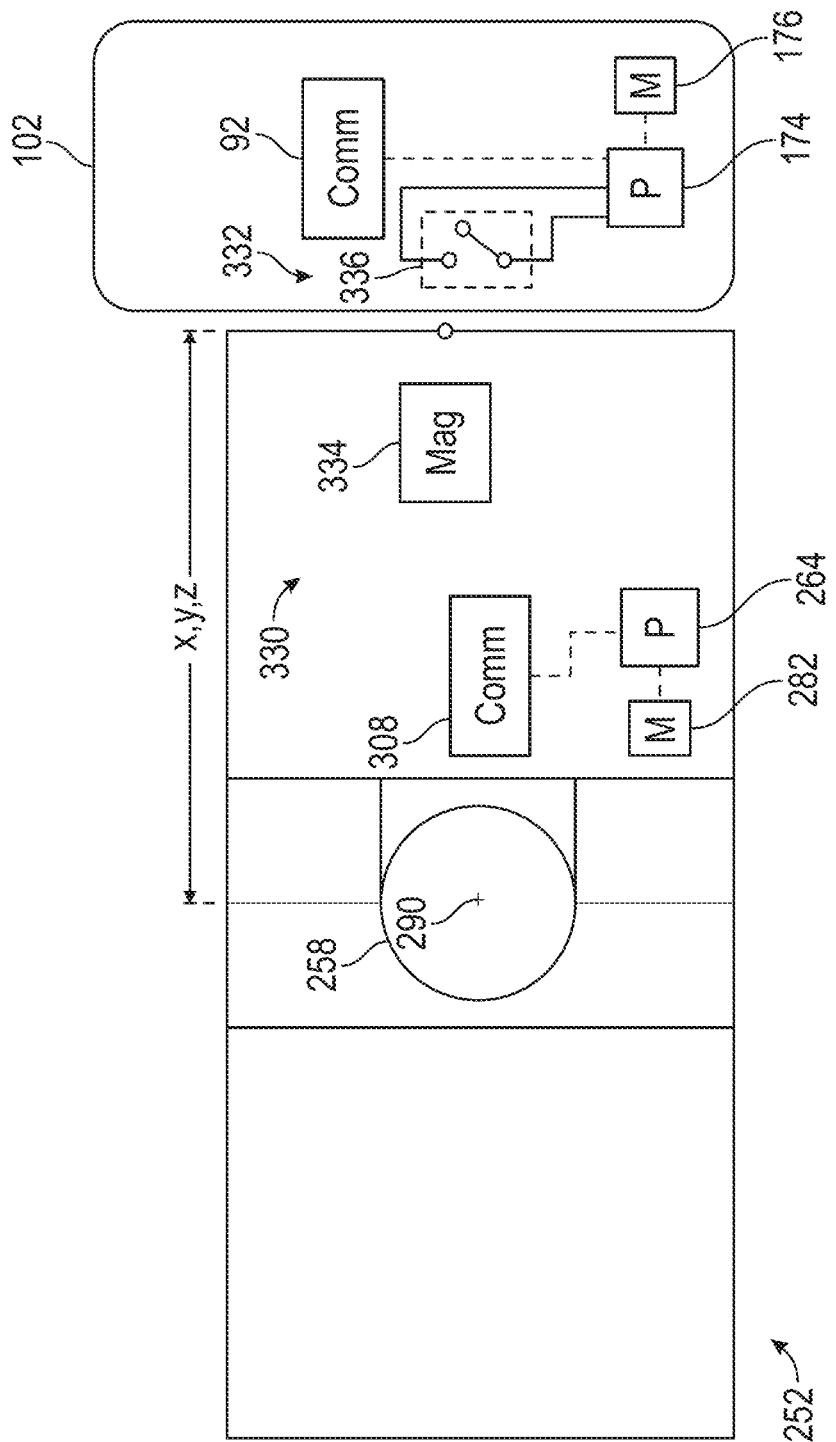
FIG. 12 is a schematic illustration of a laser scanner and a mobile computing device in accordance with another embodiment.

Referring now to FIG. 12, another embodiment of the system 250 with the laser tracker 252 and the mobile computing device 102 having position indicators 330, 332 respectively. In this embodiment, the position indicator 330 of the laser scanner 252 is a magnetic member 334. The magnet 334 is disposed within or on the body of the laser scanner 252 and generates a sufficient magnetic field to change the state (e.g. from open to closed) of a switch 336 when the mobile computing device 102 is adjacent the laser scanner 252.

The mobile computing device 102 includes a position indicator 332 that includes the magnetically actuated switch 336, which is electrically coupled to the processor 174. In an embodiment, the switch 336 may be integrated or coupled to a case that holds the mobile computing device 102 and is connected to the mobile computing device 102 via a wired connection to the device's external port (e.g. USB connector). In the illustrated embodiment, when the side opposite the display 114 of the mobile computing device 102 is placed against the side of the housing of the laser scanner 252 with the magnet 334 aligned with switch 336, the position indicators 330, 332 are in contact. In an embodiment, the laser scanner housing and the body of the mobile computing device may have markings or indicia (e.g. lines or arrows) that provide a visual guide to the operator and assist with the alignment.

In an embodiment, the processor 174 detects the change of state of the switch 336. The processor 174 then transmits a signal containing the estimated position of the mobile computing device 102 via communications module 92 (e.g., WiFi 182 and/or Bluetooth 1176) to the laser scanner 252. It should be appreciated that the positions of the magnet 334 and the switch 336 may be reversed (e.g. the switch is located in the laser scanner 252).

Figure 13:
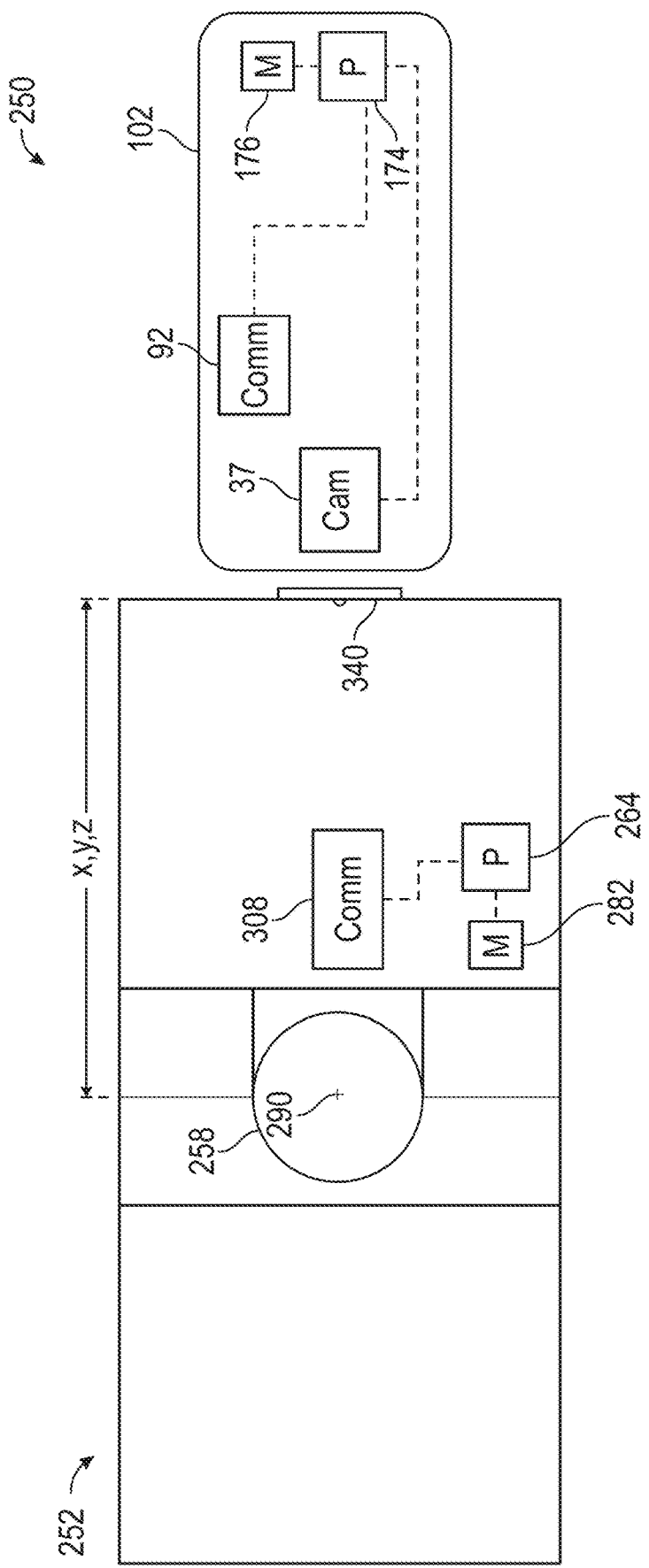
FIG. 13 is a schematic illustration of a laser scanner and a mobile computing device in accordance with another embodiment.
Figure 14:
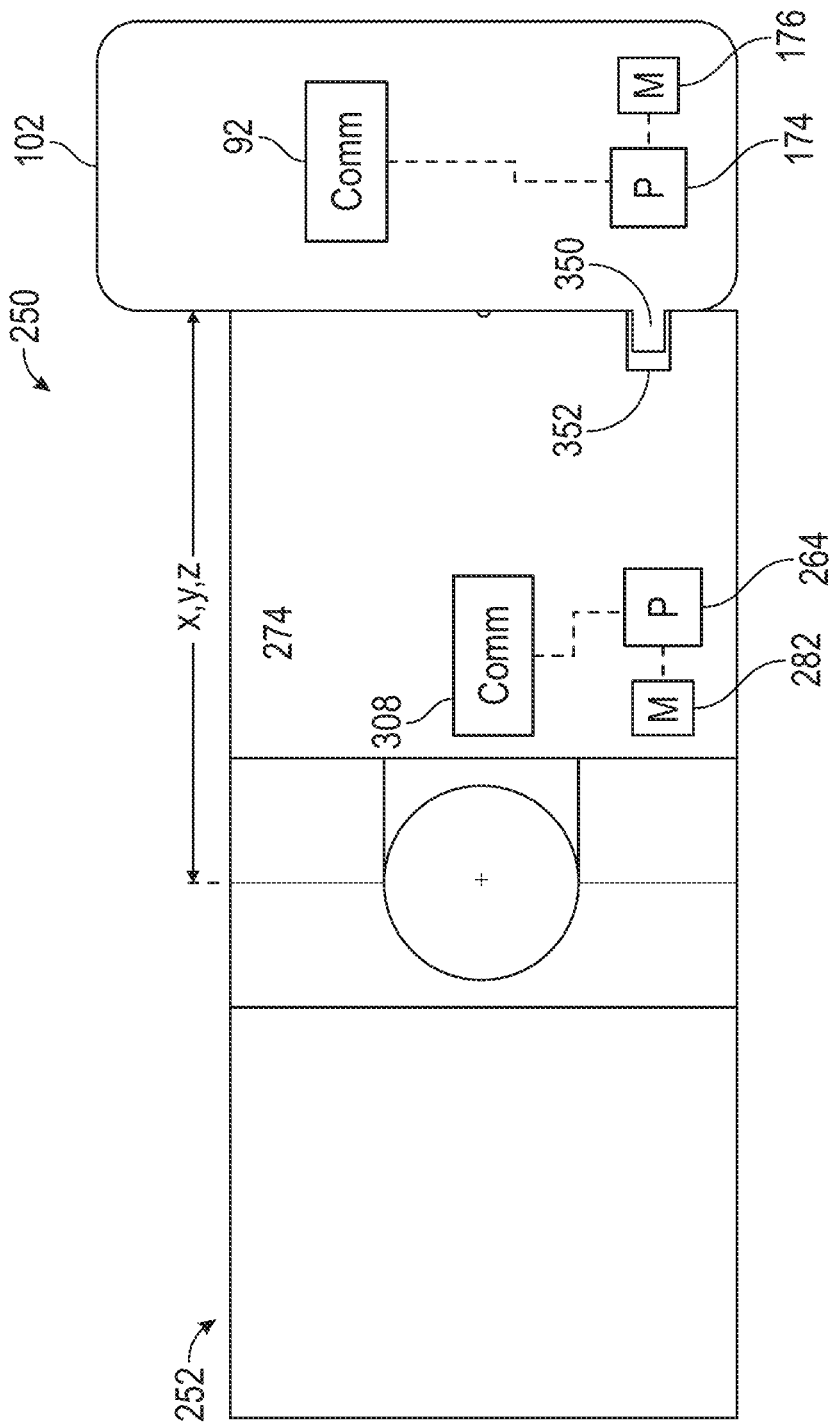
FIG. 14 is a schematic illustration of a laser scanner and a mobile computing device in accordance with another embodiment.

Referring now to FIG. 13, another embodiment is shown of the system 250 with the laser tracker 252 having position indicator 340. In this embodiment, the position indicator 340 of the laser scanner 252 is a machine readable symbol, such as but not limited to a QR code (i.e. a matrix bar-code compliant with ISO/ISC 117604:2015) or a bar-code (i.e. compliant with ISO/IEC 15416 or ANSI/UCC5) for example. The position indicator 340 may be a label with an adhesive back that is adhered to the housing of the laser scanner 252 at a predetermined position.

In this embodiment the operator aligns the mobile computing device 102 so that the camera 172 is facing the position indicator 340 as illustrated in FIG. 13. When the mobile computing device 102 and the camera 172 are aligned, the operator may actuate an actuator to acquire an image of the position indicator 340 with the camera 172. In this embodiment, when the laser scanner 252 and the mobile computing device 102 are so aligned this allows the camera 172 to engage the position indicator 340. From the acquired image, the processor 174 can decode or translate the information stored in the position indicator 340. The information included in the machine readable symbol on the position indicator 340 includes information that allows the mobile computing device 102 to connect via communications module 92 to the laser scanner 252 (via communications module 308). The machine readable symbol information may include, but it not limited to: a serial number, an identification code, a user-defined name, a web address, a network address, a media access control (MAC) address, a password for connecting with the laser scanner 252, or a combination of the foregoing.

In still another embodiment shown in FIG. 14, the mobile computing device 102 includes an element, such as pin 350 for example, on the body or case of the mobile computing device 102. The element 350 is at a known predetermined position relative to the mobile computing device coordinate frame of reference. The element 350 engages and cooperates with an element on the laser scanner 252, such as hole 352 for example, such that when the elements 350, 352 are in contact, a mathematical relationship may be determined between the mobile computing device coordinate frame of reference and the laser scanner coordinate frame of reference.

It should be appreciated that while the illustrated embodiment shows the elements 350, 352 as a pin and a hole, this is for exemplary reasons and the claims should not be so limited. In other embodiments, other element shapes may be used, such as for example, projections and recesses. Further, the element 350 may be arranged on any surface or side of the mobile computing device that allows the element 350 to engage element 352. Further, the element 352 may be arranged on any side of the housing of the laser scanner 252. For example, the element 352 may be on a top surface of the laser scanner housing and the element 350 may be on a lower or bottom surface of the mobile computing device body. In still further embodiments, multiple elements 350, 352 may be provided that are each engaged with each other during the registration process.

In operation, the operator would align the mobile computing device 102 with the laser scanner 252 and engage the elements 350, 352. With the elements 350, 352 engaged, the operator actuates an actuator, such as actuator 38 to transmit a signal containing the estimated pose of the mobile communication device 102 via the communications module 92 to the laser scanner 252. In this way, the tracking frame of the mobile tracking device 102 can be used to register the 3D scans of the laser scanner.

It should be appreciated that in some embodiments, the systems 250 illustrated in FIG. 9 and FIGS. 11-13 may be combined. For example, the NFC system of FIG. 9, or the magnetic switch of FIG. 12 may include mechanical elements 350, 352 to assist with positioning of the mobile computing device 102 relative to the laser scanner 252.

In an alternative embodiment, the mobile computing device 102 is connected to a data capture device (e.g., a 360° camera, a laser scanner) via Wi-Fi. This allows both devices to communicate with each other and to exchange information such as registration and location information. When connected to a camera, such as a 360° camera, via Wi-Fi, the mobile communication device 102 can take pictures remotely and download them. When connected to a laser scanner via Wi-Fi, the mobile communication device 102 can send position information to the laser scanner when a scan is started. In both cases a manual method can be applied to obtain the correct position information for the data capture device and exchange this information. In an embodiment this is performed by the user marking the position of the data capture device by moving the mobile communication device 102 over the data capture device. In an embodiment, the mobile communication device 102 is vertically aligned with the data capture device and the user confirms the position. The user can then move anywhere with the mobile communication device 102 and initiate the recording process (e.g., start a scan on the laser scanner or take a picture with the camera).

Figure 15:
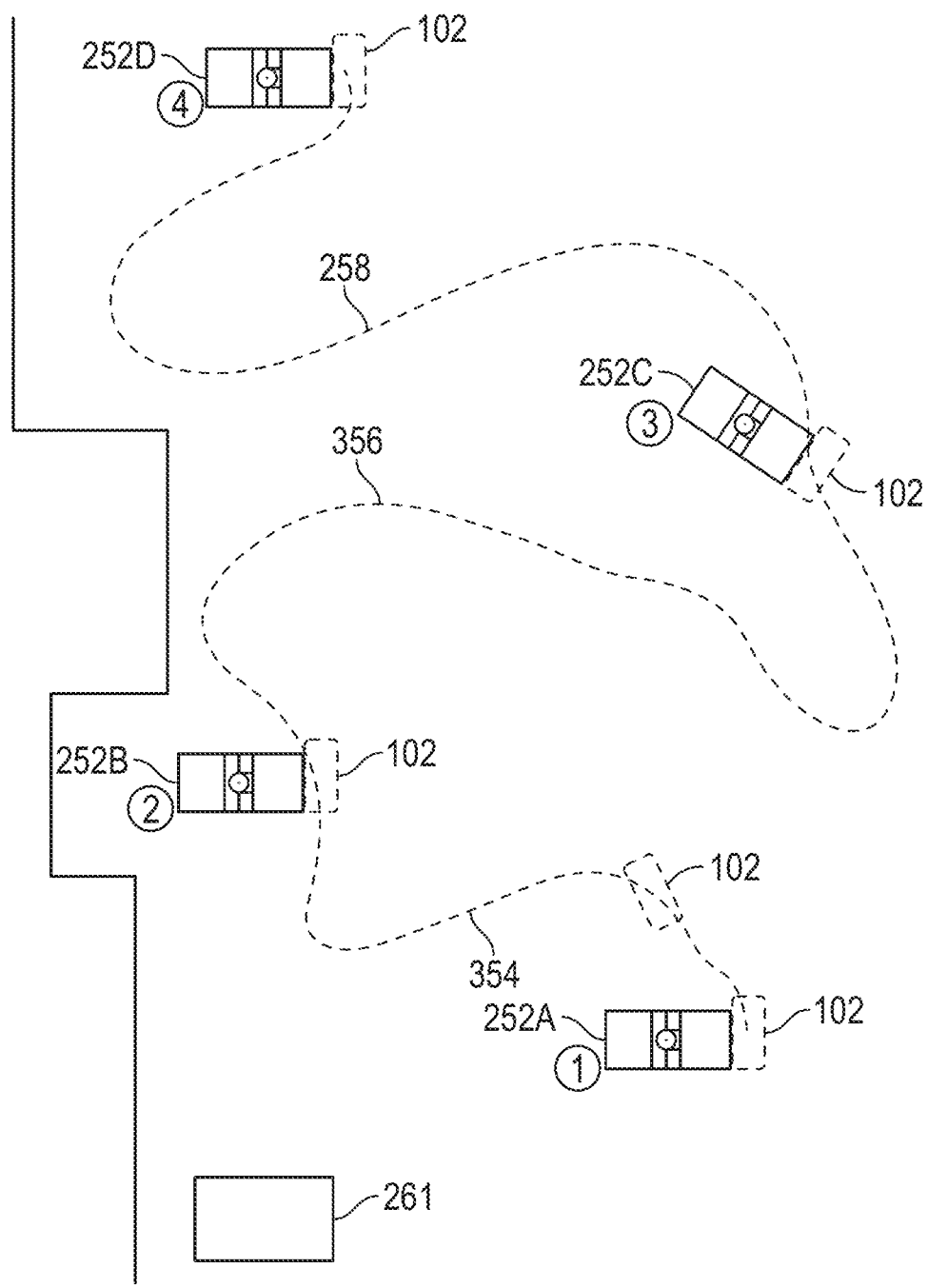
FIG. 15 is a schematic illustration of a mobile scanning system using a mobile computing device with multiple laser scanners in accordance with another embodiment.

Referring now to FIG. 15, in an embodiment the mobile computing device 102 may be used with multiple laser scanners 252A-252D. It should be appreciated that the use of four laser scanners is exemplary and the system 250 may use more or fewer laser scanners 30. Further, in other embodiments, multiple mobile computing devices 30 may be used and are each registered to one or more laser scanners 252A-252D.

In an embodiment, the laser scanners 252A-252D are each connected for communication to a remote computer system 261, such as by a local area network for example. The 3D scan data from the laser scanners 252A-252D and the estimated poses of the mobile computing device 102 may be transmitted to the computer 261 where the 3D scan data is transformed into a global coordinate frame of reference based on the tracking frame of the mobile device 102.

Figure 16:
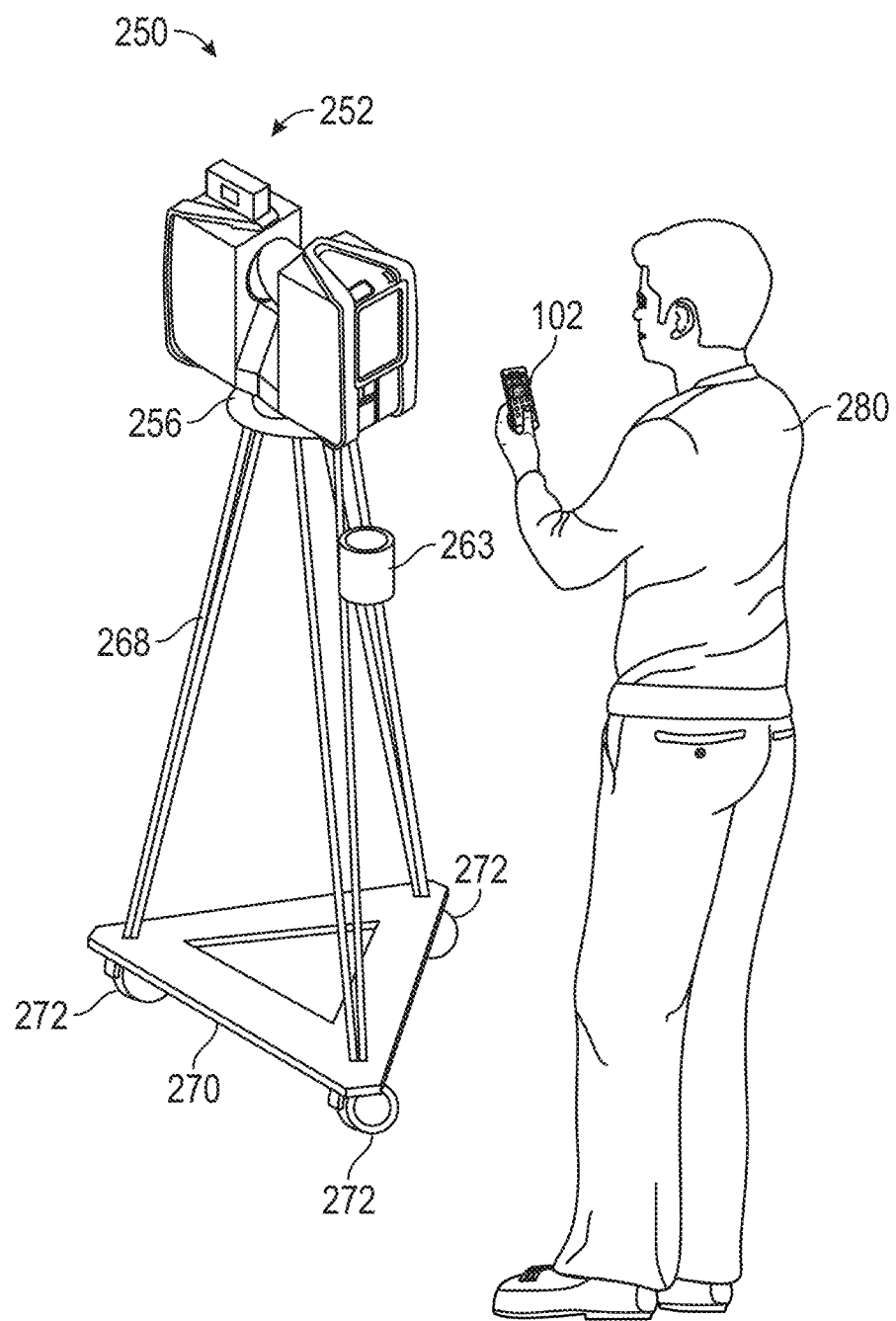
FIGS. 16-17 are perspective views of a mobile scanning system having a coupler for mounting the mobile computing device to the laser scanner in accordance with another embodiment The detailed description explains embodiments of the invention, together with advantages and features, by way of example with reference to the drawings.
Figure 17:
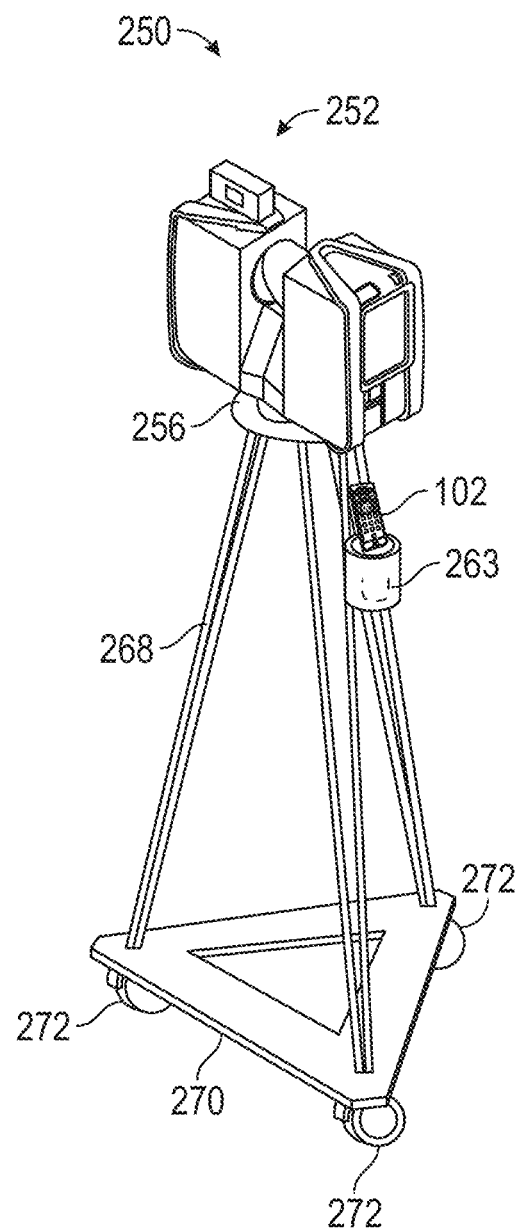

Referring now to FIG. 16 and FIG. 17 another embodiment of system 250 is shown. In this embodiment, a holder 263 is coupled in a fixed relationship to the laser scanner 252. It should be appreciated that while the illustrated embodiment shows the holder 263 as being coupled to the frame 268, this is for exemplary reasons and in other embodiments, the holder 263 may be coupled to other components, such as but not limited to the platform 270, the housing of the laser scanner 252, or the base 256 for example.

In an embodiment, the holder 263 includes a means for holding the mobile computing device 102 in a fixed relationship to the coordinate frame of reference of the laser scanner 30 (e.g. the gimbal point 290). In an embodiment, the means holds the 2D laser scanner such that the mobile computing device 102 coordinate frame of reference is fixed in six degrees of freedom relative to the coordinate frame of reference of the laser scanner 252. In an embodiment, the holder 263 may include a cavity that is sized and shaped to receive the mobile computing device 102. In another embodiment, the holder 263 may include a clamping mechanism that is operable to couple with the mobile computing device 102. The estimated poses of the mobile computing device 102 are transferred as described herein with reference to method 300.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A scanning system comprising:
    a mobile device having a camera and a first position indicator;
    a mobile scanner having a light emitter and a light receiver, the scanner determining coordinates of surfaces in an environment in response to emitting light with the light emitter and receiving light with the light receiver, the scanner having a second position indicator, the scanner being separately movable from the mobile device; and
    one or more processors that determine the position of the mobile device and transmits data between the scanner and the mobile device in response to an operator moving one of the mobile device or scanner adjacent the other of the mobile device or scanner and the first position indicator engaging the second position indicator, wherein the data includes position data of the mobile device.

2. The system of claim 1, wherein the one or more processors further acquire an image of the current field of view of the camera in response to an input from a user.

3. The system of claim 1, wherein the camera is a 360° camera.

4. The system of claim 1, wherein the first position indicator is a machine readable indicia system.

5. The system of claim 4, wherein the first position indicator is a QR code.

6. The system of claim 1, wherein the first position indicator is a near field communications device.

7. A method of scanning an environment, the method comprising:
- acquiring coordinates of points of surfaces in an environment with a mobile scanner, the scanner having a light emitter and a light receiver;
- acquiring an image of the environment with a camera connected to a mobile device, the mobile device being separately movable from the scanner;
- moving one of the scanner or mobile device adjacent the other of the scanner or mobile device;
- engaging a first position indicator of the mobile device with a second position indicator of the scanner when the one of the scanner or mobile device is adjacent the other of the scanner or mobile device; and
- transferring data between the mobile device and the scanner in response to the first position indicator engaging the second position indicator, wherein the data includes position data of the mobile device relative to the scanner.

8. The method of claim 7, wherein the image is acquired with a 360° camera.

9. The method of claim 7, wherein the transferring of the data is performed using a wireless communications circuit.

10. The method of claim 7, wherein the engaging of the first position indicator with the second position indicator includes reading a QR code.

11. The method of claim 7, wherein the engaging of the first position indicator with the second position indicator includes activating a near field communication device.

12. A scanning system comprising:
- a mobile device having a 360 degree camera and a first position indicator;
- a mobile scanner having a light emitter and a light receiver arranged to receive light emitted from the light emitter and reflected from a surface in an environment, the scanner further having a second position indicator, the mobile scanner being separately movable from the mobile device; and
- one or more processors that determine coordinates of surfaces in an environment in response to emitting light with the light emitter and receiving light with the light receiver, the one or more processors further determining the position of the mobile device and transmits data between the scanner and the mobile device in response to an operator moving one of the mobile device or scanner adjacent the other of the mobile device or scanner and the first position indicator engaging the second position indicator, wherein the data includes position data of the mobile device in the environment.

13. The system of claim 12, wherein the first position indicator is one of a machine readable indicia system, a QR code, or a near field communications device.

\* \* \* \* \*